US011057772B2

(12) United States Patent
Koskimies (10) Patent No.: US 11,057,772 B2
(45) Date of Patent: Jul. 6, 2021

(54) MESSAGE AUTHENTICATION

(71) Applicant: Nokia Technologies Oy, Espoo (FI)

(72) Inventor: Olli Oskari Koskimies, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 70 days.

(21) Appl. No.: 15/767,190

(22) PCT Filed: Oct. 16, 2015

(86) PCT No.: PCT/FI2015/050701
§ 371 (c)(1),
(2) Date: Apr. 10, 2018

(87) PCT Pub. No.: WO2017/064361
PCT Pub. Date: Apr. 20, 2017

(65) Prior Publication Data
US 2019/0074975 A1    Mar. 7, 2019

(51) Int. Cl.
*H04W 12/106* (2021.01)
*H04L 29/06* (2006.01)
(Continued)

(52) U.S. Cl.
CPC ........ *H04W 12/106* (2021.01); *G06F 21/606* (2013.01); *G06F 21/64* (2013.01);
(Continued)

(58) Field of Classification Search
CPC ..... H04L 9/3242; H04L 9/3236; H04L 9/085; H04L 9/3297; H04L 63/123;
(Continued)

(56) References Cited

U.S. PATENT DOCUMENTS 6,829,357 B1 * 12/2004 Alrabady .............. H04L 9/0656
380/260
6,842,628 B1 * 1/2005 Arnold .................... H04L 51/24
455/556.2
(Continued)

FOREIGN PATENT DOCUMENTS

CN          1636375 A      7/2005
CN        101060405 A     10/2007
(Continued)

OTHER PUBLICATIONS

IP.com Search Query; May 29, 2020 (Year: 2020).*
(Continued)

*Primary Examiner* — Samson B Lemma
*Assistant Examiner* — Blake I Narramore
(74) *Attorney, Agent, or Firm* — Laine IP Oy (57) ABSTRACT

According to an example aspect of the present invention, there is provided an apparatus comprising at least one processing core, at least one memory including computer program code, the at least one memory and the computer program code being configured to, with the at least one processing core, cause the apparatus at least to compile, from information comprised in a message received in the apparatus, a protection bit sequence, the protection bit sequence comprising a first part and a second part, identify a sender of the message based on identifying a secret key that decrypts the first part into a plaintext bit sequence comprised in the message, and verify the protection bit sequence has been advanced with respect to a protection bit sequence in a previous message from the same sender.

12 Claims, 6 Drawing Sheets

(51) Int. Cl.
*G06F 21/60* (2013.01)
*G06F 21/64* (2013.01)
*H04L 9/32* (2006.01)
*H04W 12/108* (2021.01)
*H04W 12/122* (2021.01)
*H04W 12/126* (2021.01)
*H04L 9/08* (2006.01)

(52) U.S. Cl.
CPC ............ *H04L 9/085* (2013.01); *H04L 9/3236* (2013.01); *H04L 9/3242* (2013.01); *H04L 9/3297* (2013.01); *H04L 63/123* (2013.01); *H04W 12/108* (2021.01); *H04W 12/122* (2021.01); *H04W 12/126* (2021.01); *H04L 2209/80* (2013.01)

(58) Field of Classification Search
CPC .......... H04L 2209/80; H04W 12/1006; H04W 12/1008; H04W 12/04; H04W 12/10; H04W 12/12; G06F 21/606; G06F 21/64
See application file for complete search history.

(56) References Cited

U.S. PATENT DOCUMENTS

| | | | |
|---|---|---|---|
| 7,095,855 B1* | 8/2006 | Collins | H04L 63/08 380/241 |
| 7,418,595 B2* | 8/2008 | Eronen | H04L 9/002 380/44 |
| 7,653,815 B2* | 1/2010 | Godfrey | G06Q 10/107 713/176 |
| 7,725,719 B2* | 5/2010 | Sandberg | H04L 9/3242 713/170 |
| 8,245,048 B2* | 8/2012 | Chai | H04L 9/3271 713/170 |
| 9,043,602 B1 | 5/2015 | Krieger et al. | |
| 9,106,648 B2* | 8/2015 | Zhou | H04L 65/1069 |
| 9,461,820 B1* | 10/2016 | Dall | H04L 63/0838 |
| 9,614,868 B2* | 4/2017 | Yavuz | H04L 9/14 |
| 9,705,678 B1* | 7/2017 | Wang | G06F 21/44 |
| 10,153,901 B2* | 12/2018 | Thackston | G07F 17/3241 |
| 10,237,073 B2* | 3/2019 | Benson | H04W 12/1208 |
| 10,313,125 B2* | 6/2019 | Dubrova | H04L 9/14 |
| 2004/0153419 A1* | 8/2004 | Wary | G06Q 20/02 705/71 |
| 2004/0193875 A1* | 9/2004 | Aura | H04L 9/3236 713/162 |
| 2007/0073821 A1* | 3/2007 | Brail | H04L 67/26 709/206 |
| 2009/0016527 A1* | 1/2009 | Vigarie | H04L 9/0844 380/259 |
| 2010/0174897 A1* | 7/2010 | Schumacher | H04L 9/0656 713/150 |
| 2011/0087887 A1* | 4/2011 | Luft | H04L 9/3247 713/178 |
| 2013/0010960 A1* | 1/2013 | Ho | H04L 9/0637 380/270 |
| 2014/0133656 A1* | 5/2014 | Wurster | H04L 9/0637 380/270 |
| 2014/0177830 A1 | 6/2014 | Gajek | |
| 2014/0378057 A1* | 12/2014 | Ramon | H04L 9/32 455/41.2 |
| 2015/0188891 A1 | 7/2015 | Grange et al. | |
| 2015/0350251 A1* | 12/2015 | Brander | H04L 63/20 713/168 |
| 2018/0084422 A1* | 3/2018 | Mendelovich | H04L 9/3226 |

FOREIGN PATENT DOCUMENTS

| | | | | |
|---|---|---|---|---|
| CN | 103312668 A | 9/2013 | | |
| EP | 2339777 A2 | 8/2011 | | |
| EP | 2645665 A1 | 10/2013 | | |
| EP | 2884776 A2 | 6/2015 | | |
| GB | 2494550 A | 3/2013 | | |
| WO | 2010/117746 A1 | 10/2010 | | |
| WO | WO2013128317 A1 | 6/2011 | | |
| WO | 2013/126759 A2 | 8/2013 | | |
| WO | WO-2013128317 A1 * | 9/2013 | ........... | H04L 9/3247 |
| WO | 2015/102880 A1 | 7/2015 | | |
| WO | 2017/055676 A1 | 4/2017 | | |

OTHER PUBLICATIONS

IP.com Search Query; Nov. 5, 2020 (Year: 2020).*
"Bluetooth Specification Version 4.2", Bluetooth, vol. 6, Dec. 2, 2014, 192 pages.
"Bluetooth Security Mechanisms", Pervasive Security and Privacy, Retrieved on Jul. 31, 2015, Webpage available at : http://pervasive.cs.uah.edu/PSP/BluetoothSecurity.
"The Emergence of Bluetooth Low Energy", Contextis, Retrieved on Mar. 15, 2018, Webpage available at : https://www.contextis.com/blog/the-emergence-of-bluetooth-low-energy.
Elmufti et al., "Timestamp Authentication Protocol for Remote Monitoring in EHealth", Second International Conference on Pervasive Computing Technologies for Healthcare, Jan. 30-Feb. 1, 2008, 4 pages.
Mahalle et al., "Identity Authentication and CapabilityBased Access Control (IACAC) for the Internet of Things", Journal of Cyber Security and Mobility, vol. 1, Feb. 17, 2013, pp. 309-348.
International Search Report and Written Opinion received for corresponding Patent Cooperation Treaty Application No. PCT/FI2015/050701, dated Feb. 16, 2016, 18 pages.
Frantti et al., "A Risk-Driven Security Analysis For a Bluetooth Low Energy Based Microdata Ecosystem", Sixth International Conference on Ubiquitous and Future Networks (ICUFN), 2014, pp. 69-74.

* cited by examiner

MESSAGE AUTHENTICATION

RELATED APPLICATION

This application was originally filed as PCT Application No. PCT/FI2015/050701 filed Oct. 16, 2015.

FIELD

The present application relates to the field of message authentication, for example in a wireless environment.

BACKGROUND

In electronic communication, such as wire-line or wireless electronic communication, ensuring message authenticity may be of high importance. For example, when communicating sensitive information, such as information relevant to health, personal finances, personal communication, corporate plans, unreleased corporate financial results or information relating to public safety, message authenticity may be an important requirement. Furthermore, even when communicating only to cause electrically locked doors to open, for example, authentication of packet origin may be important to prevent unauthorized persons from passing through the doors.

To guard against a replay attack, where an attacker records a communicated packet and later provides it, a counter or timestamp may be employed. For example, where an electronically locked door is opened by transmitting a suitable packet, furnishing the packet with a counter or a timestamp helps guard against replaying recorded messages, since a replayed message would comprise an old timestamp, enabling both detection of the attempted deception and discarding the replayed packet.

To guard against a forged packet, for example where a recorded packet is modified to make a timestamp comprised therein more recent, communicated packets may comprise hash values. In these cases, a hash may be derived over the contents of a packet, including the timestamp, and a secret shared between the transmitter and recipient.

Changing the timestamp would cause the hash to no longer correspond to the contents of the packet, enabling detection of the forgery by re-deriving the hash in the receiver end and comparing the re-derived hash to the hash comprised in the message. An attacker not in possession of the shared secret would not know how to modify the hash value comprised in the recorded packet so as to make it match the changed timestamp.

A hash may be derived using, for example, a cryptographic hash algorithm such as secure hash algorithm 1, SHA-1. SHA-1 outputs a 160-bit hash value as an output.

SUMMARY OF THE INVENTION

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to compile, from information comprised in a message received in the apparatus, a protection bit sequence, the protection bit sequence comprising a first part and a second part, identify a sender of the message based on identifying a secret key that decrypts the first part into a plaintext bit sequence comprised in the message, and verify the protection bit sequence has been advanced with respect to a protection bit sequence in a previous message from the same sender.

According to a second aspect of the present invention, there is provided. An apparatus comprising at least one processing core, at least one memory including computer program code, the at least one memory and the computer program code being configured to, with the at least one processing core, cause the apparatus at least to compile a message for transmission, the message comprising a protection bit sequence arranged in a first part and a second part, select the protection bit sequence by advancing a previously used protection bit sequence, and encrypt, using a secret key, the first part and include in the message the first part in both encrypted and unencrypted form.

According to a third aspect of the present invention, there is provided a method comprising compiling, from information comprised in a message received in an apparatus, a protection bit sequence, the protection bit sequence comprising a first part and a second part, identifying a sender of the message based on identifying a secret key that decrypts the first part into a plaintext bit sequence comprised in the message, and verifying the protection bit sequence has been advanced with respect to a protection bit sequence in a previous message from the same sender.

According to a fourth aspect of the present invention, there is provided a method comprising compiling a message for transmission, the message comprising a protection bit sequence arranged in a first part and a second part, selecting the protection bit sequence by advancing a previously used protection bit sequence, encrypting, using a secret key, the first part and including in the message the first part in both encrypted and unencrypted form According to a fifth aspect of the present invention, there is provided an apparatus comprising means for compiling, from information comprised in a message received in the apparatus, a protection bit sequence, the protection bit sequence comprising a first part and a second part, means for identifying a sender of the message based on identifying a secret key that decrypts the first part into a plaintext bit sequence comprised in the message, and means for verifying the protection bit sequence has been advanced with respect to a protection bit sequence in a previous message from the same sender.

According to a sixth aspect of the present invention, there is provided an apparatus comprising means for compiling a message for transmission, the message comprising a protection bit sequence arranged in a first part and a second part, means for selecting the protection bit sequence by advancing a previously used protection bit sequence, means for encrypting, using a secret key, the first part and means for including in the message the first part in both encrypted and unencrypted form.

According to a seventh aspect of the present invention, there is provided a non-transitory computer readable medium having stored thereon a set of computer readable instructions that, when executed by at least one processor, cause an apparatus to at least compile, from information comprised in a message received in the apparatus, a protection bit sequence, the protection bit sequence comprising a first part and a second part, identify a sender of the message based on identifying a secret key that decrypts the first part into a plaintext bit sequence comprised in the message, and verify the protection bit sequence has been advanced with respect to a protection bit sequence in a previous message from the same sender.

According to a eighth aspect of the present invention, there is provided a non-transitory computer readable medium having stored thereon a set of computer readable instructions that, when executed by at least one processor, cause an apparatus to at least compile a message for transmission, the message comprising a protection bit sequence arranged in a first part and a second part, select the protection bit sequence by advancing a previously used protection bit sequence, encrypt, using a secret key, the first part and include in the message the first part in both encrypted and unencrypted form.

According to a ninth aspect of the present invention, there is provided a computer program configured to cause a method in accordance with at least one of the third and fourth aspects to be performed.

EMBODIMENTS

By including in a message a protection bit sequence, such as a counter or a timestamp, divided into two parts, authentication of the message may be facilitated. In detail, a first part of the protection bit sequence may be provided in the message in both plaintext, that is, unencrypted, format and in encrypted format. A second part of the protection bit sequence may be provided elsewhere in the message, for example in unencrypted format. Thus a receiver that is in possession of a collection of secret keys may try the secret keys in turn, to find out which one was used to encrypt the plaintext format first part of the protection bit sequence in the message into the encrypted format first part of the protection bit sequence in the message. The identified secret key is associated with a sender identity, which is then taken as an identity of a node that sent the message. A sender address field may be used, at least in part, for the protection bit sequence, in other words, a sender address field may be set, at least in part, to a part of the protection bit sequence.

The protection bit sequence, both parts together, may be incrementing between messages from the same sender, to protect against replay attacks. Authenticating the message may further comprise checking the protection bit sequence in the message, comprising both parts, is incremented with respect to a preceding, for example a sequentially immediately preceding, message from the same recipient. Herein the term incrementing may also, where applicable, refer to decrementing, which are both examples of advancing.

Figure 1:
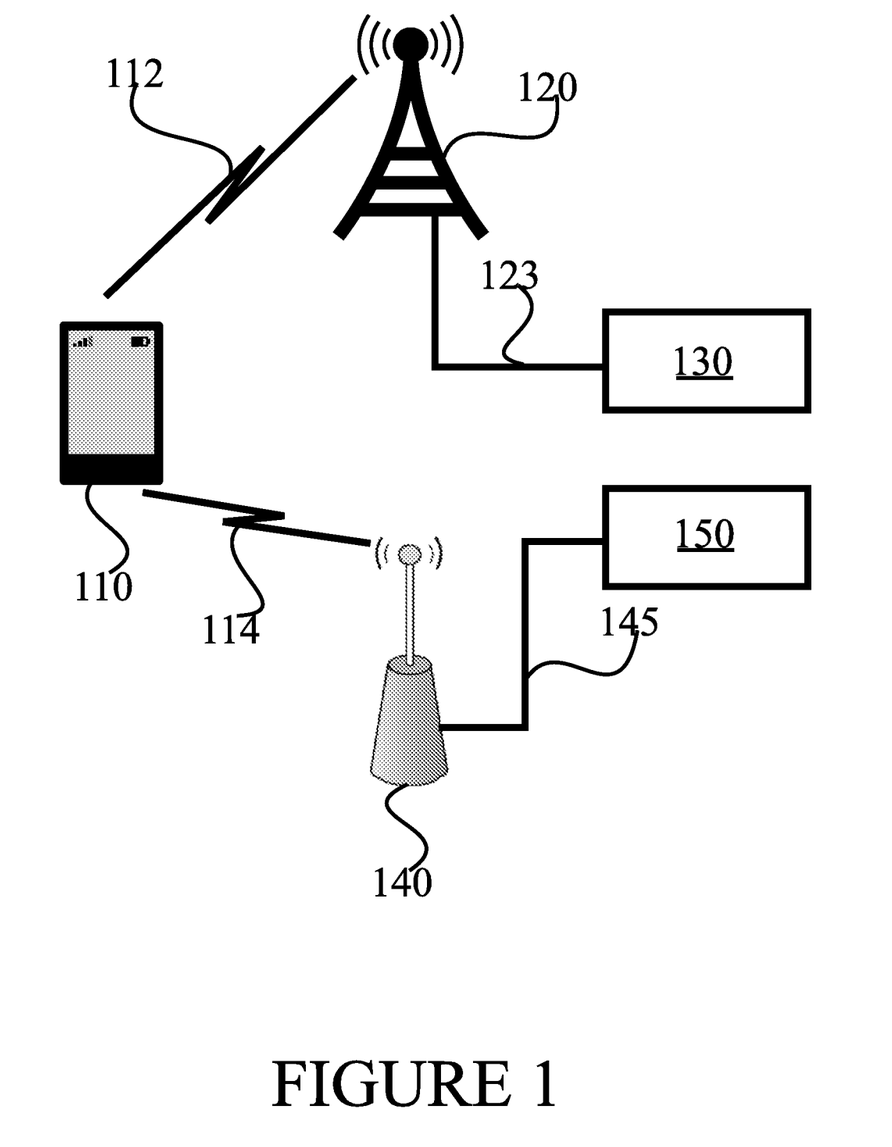
FIG. 1 illustrates a system in accordance with at least some embodiments of the present invention.

FIG. 1 illustrates a system in accordance with at least some embodiments of the present invention. The system of FIG. 1 comprises device 110, which may comprise, for example, an electrical key device, a personal device, a cellular telephone, a smartphone, a phablet device, a tablet computer, a laptop computer, a desktop computer or another kind of suitable device, for example. Device 110 may be configured to transmit messages. Such messages may be formatted according to a predefined scheme, for example, into data structures that comprise one or a plurality of bit fields. The bit fields may be of predetermined lengths, for example 32 bits, 8 bits or 160 bits. The bit fields may be of differing lengths with respect to each other.

Messages transmitted from device 110 may reach their destination via air interface 112 and base station 120, for example. In the illustrated example, base station 120 is arranged to function in accordance with a cellular communication standard, or technology, such as, for example, long term evolution, LTE, wideband code division multiple access, WCDMA, or interim standard 95, IS-95. Air interface 112 is arranged in accordance with a same technology as base station 120. Where transmitted via air interface 112 and base station 120, the messages originating in device 110 may be conveyed to their recipient 130 via connection 123, which may comprise, for example, a wire-line interface such as Ethernet, or an at least in part wireless interface.

Alternatively, or additionally, to messaging via base station 120, device 110 may be arranged to transmit messages via access point 140. In this case, messages are conveyed toward recipient 150 via air interface 114, access point 140 and connection 145. Connection 145 may be wire-line or at least in part wireless. Air interface 114 and access point 140 may be configured to operate in accordance with a non-cellular technology, such as Bluetooth, Bluetooth-low energy, BTLE, wireless local area network, WLAN, or worldwide interoperability for microwave access, WiMAX, for example.

Air interfaces 112 and 114 may be bidirectional, in other words, comprising an uplink arranged to convey information from device 110 to base station 120 or access point 140, and comprising a downlink arranged to convey information toward device 110. Connections 123 and/or 145 may likewise be bidirectional.

Recipient 130 and recipient 150 may, depending on the embodiment, be the same recipient or two distinct recipients. In some embodiments, recipient 130 is integrated in or with base station 120. In some embodiments recipient 150 is integrated in or with access point 140. Recipient 130 and/or recipient 150 may comprise a server, for example, or a control device configured to control a process, such as a door opening mechanism or industrial process, for example. In some embodiments, device 110 is configured to communicate using only one technology. For example, where device 110 comprises an electric key device, it may be configured to communicate with BTLE, only, by sending messages to a control device and receiving responses therefrom. Additionally to, or alternatively to, wireless communication device 110 may be configured to transmit messages using a wire-line connection.

A recipient of a message, such as for example recipient 130 or recipient 140, may be configured to take steps to ensure security of messaging between itself and a sender, such as device 110. Ensuring security may comprise at least one of employing encryption to render message contents inaccessible to eavesdroppers, verifying the authenticity of the message and guarding against replay attacks. Verifying the authenticity, or authenticating, a message may comprise enhancing reliability that the message was created by the correct transmitter. Replay attacks comprise attacks wherein the attacker records a transmitted authentic message, for example while it traverses the air interface, and subsequently transmits the recorded message. Since the recorded message is originally authentic and thus has features of an authentic message, specific measures may need to be taken to ensure the recorded message is not accepted by the recipient.

Encrypting content may comprise providing the content as input to an encryption algorithm, and transmitting encrypted content provided from the encryption algorithm as output. Examples of encryption algorithms are symmetric encryption algorithms and public key encryption algorithms. Examples of symmetric encryption algorithms include triple-DES and advanced encryption standard, AES, while examples of public key encryption algorithms include the RSA and ElGamal algorithms.

Authenticating may comprise verifying an authentication feature of a message. For example, contents of a message may be cryptographically signed using a public key cryptosystem, wherein a private key is used for signing and a corresponding public key is usable in verifying the signature. Alternatively, or additionally, a hash function may be used to derive a hash value, such that contents of the message, and a shared secret, are provided to the hash function, and a hash value is obtained from the hash function as output. The shared secret may comprise a secret encryption key where the secret encryption key is shared with an intended recipient of the message. The hash function may comprise a cryptographic hash function, for example. The hash value may be included in the message, enabling the recipient to re-derive the hash using message content and the shared secret, to check the sender was in possession of the shared secret by comparing the re-derived hash value to the hash value in the message. Examples of hash functions include SHA-1, SHA-2, SHA-3 and MD5. The hash value may be included in the message in its entirety, or in part. Where the hash value is included in part, this included part may be referred to as a truncated hash value, which may comprise a subset of bits of the entire hash value.

Guarding against replay attacks may comprise furnishing the message with a protection bit sequence, such as, for example, a counter or a timestamp. A timestamp may comprise an indication of a time when the message is compiled or sent, and verifying the timestamp to guard against replay may comprise comparing the timestamp to a current time available to the recipient. In case the current time is later than the time indicated in the timestamp by more than a threshold length of time, the timestamp may be considered to fail verification. Since transmitting and receiving the message takes a finite time, and the clocks of the transmitter and recipient may not be perfectly aligned, the timestamp may differ by the threshold length of time from the current time and still pass verification. In some embodiments, the recipient is configured to reject messages from the same transmitter in case the reconstructed timestamp is not greater than that of the previous message from the same transmitter. A timestamp that is identical to one in a previous message may be an indication of a replayed message.

In some embodiments, where the timestamp is incremented only relatively rarely, for example once a second, it may occur that consecutive authentic and non-replayed messages have a same timestamp. In such embodiments, recipients may be configured to accept such messages. An advantage of a slowly incrementing timestamp is that the timestamp information in the message may be conveyed using relatively few bits.

A full timestamp, expressed as a binary variable, may take at least 4 bytes of space. A byte is eight bits. A typical hash value takes 8 bytes. In total, a timestamp and a hash value may thus take at least 12 bytes in a message. Verifying a counter may comprise checking that the counter has been advanced from previous messages from the same sender. In case the recipient has already received a message from the sender with the same counter value, the message may be rejected as a replayed message.

In case device 110 uses a message format in accordance with a predefined scheme when transmitting, the overall message size may, in some embodiments, be set and not modifiable by device 110. In other embodiments, device 110 may to at least some extent modify the size of the message. In case the protection bit sequence and/or hash value can be stored in the message using fewer bits, a larger fraction of the message can be used to communicate the actual contents, rather than security information such as timestamp and hash value. Even where the message size could be changed by device 110, communicating fewer bits consumes less energy and takes less time than communicating more bits, obtaining thereby advantages over communicating more bits.

When re-purposing an existing message format to a new use, including information in the message format that is not originally specified for it may become possible by using fewer bits for protection bit sequence and/or hash value use. For example, where a message format has content that cannot be removed or replaced, and a timestamp and a hash value, using even a few bits less for timestamp and/or hash value use may create a few bits' space usable for a new purpose, such as, for example a status indicator indicating a state of device 110, or a location of device 110.

Occasionally a message may be left unsent in case its essential contents may be transmitted in another message. For example, if instead of periodically transmitting sensor data and positioning data in separate messages, the sensor data can be included in positioning messages, a significant energy saving may be obtained if dedicated sensor data messages can be omitted. This may be made possible by decreasing the number of bits used for protection bit sequence and/or hash value use in the positioning messages. Such a modification is particularly useful where the sensor and positioning data are needed at the same frequency, or periodicity, for example.

In some embodiments, a number of bits allocated to a hash value may be chosen dynamically in dependence of security requirements concerning the message. For example, where a lower security requirement applies to a particular message, a shortened, truncated hash value may be used, freeing some more bits for message content. In these cases, there is a slightly larger risk that a forged hash value would accidentally be correct, however in light of the lower security requirement this may be acceptable.

After selecting an appropriate protection bit sequence for a message to be transmitted, the protection bit sequence may be split, when compiling the message for transmission in device 110, to two parts, a first part and a second part. The first part may correspond to a set of most significant bits of the protection bit sequence, and the second part may correspond to a set of least significant bits of the protection bit sequence. Concatenating the first part and the second part together may thus produce the original protection bit sequence in its entirety. The second part may be included in the message in a payload portion, for example. The first part may be included in the message in a header part, for example. The first part may be included in an address field, such as, for example, a sender address header field, such as, for example, a Bluetooth sender address header field.

Device 110 may be further configured to encrypt the first part, and to include in the message also the encrypted version of the first part of the protection bit sequence. Thus the message may comprise the encrypted first part, the unencrypted first part, and the second part. For a subsequent message, the protection bit sequence is advanced, for example incremented. As advancing affects initially the least significant bits, the first part is not immediately affected by the advancing, but eventually the second part will loop over and cause the first part to change, effectively changing the sender address in the message in embodiments where the first part is stored in the message in a sender address field.

A recipient may have stored therein, or otherwise have access to, a set of secret keys of different senders, such as device 110. Upon receipt of a message from a sender, the recipient may try to decrypt the encrypted first part initially with a first one of the secret keys, and to compare the thus obtained decrypted first part to the unencrypted first part in the message. In case these first parts match, that is, they are the same bit sequence, the sender used the first secret key in encrypting the first part and the sender is a node that is associated with the first secret key. In other words, the recipient may thus establish an identity of the sender. On the other hand, in case the first parts do not match, the recipient may decrypt the encrypted first part with a second one of the secret keys, and re-perform the comparing, and so on, until a secret key is found from among the secret keys, which unencrypts the encrypted first part such that it matches with the unencrypted version of the first part in the message. An identity of the sender may be thus established. Alternatively to decrypting the encrypted first part, the recipient may be configured to search for the correct secret key by encrypting the unencrypted first part.

Once the identity of the sender is established, subsequent messages may be processed by observing the first part and/or the encrypted first part are the same as before. Where the recipient determines that, due to the advancing of the protection bit sequence, the first part will change, the recipient may pre-derive the subsequent encrypted first part, as the recipient already knows the correct secret key and can predict the unencrypted first part. Pre-deriving may comprise advancing the first part by one, and then encrypting it with the secret key associated with the sender.

In some embodiments, the recipient may determine that it has, at least momentarily, spare processing capacity. Responsive to determining the spare processing capacity, the recipient may predict the next encrypted first part for at least one sender, and, optionally, for all senders from which the recipient has recently received at least one message, or with which the recipient is in active communication. Predicting encrypted first parts may be particularly advantageous where a single recipient communicates with a many senders, for example by receiving messages from the senders.

In case verification or authentication fails, for example responsive to the hash value derived by the recipient not matching the hash value, or truncated hash value, in the message, a response message may be sent by the recipient to the sender, the response message comprising an indication of the time according to the clock of the recipient. The sender may then either set it's time to the time indicated in the response message to align the clocks, or, if the sender has a master time, transmit an indication of the master time to the recipient to thereby align the clocks. Messages used to align clocks may be transmitted without separate timestamps. Messages used to align clocks may comprise an indication as to the intended receiver of the message, which may comprise a node identity, for example. Such messages may be encrypted, signed and/or provided with hash values derived from the contents to prevent attacks based on clock alignment messaging.

In general, when initially beginning communication, a random number may be used as a starting point in a counter. This may increase a cryptographic robustness of the solution.

For example, if a thief can determine the Bluetooth ID of an asset tag attached to a piece of expensive equipment by recording it when the equipment is visibly being used in a hospital ward, the thief can make a scanner which determines whether the equipment is inside a particular storage room, without having to open the door, making it much easier to steal equipment. Therefore, an identity of a sender may be protected, such as, for example, using methods described herein.

Figure 2:
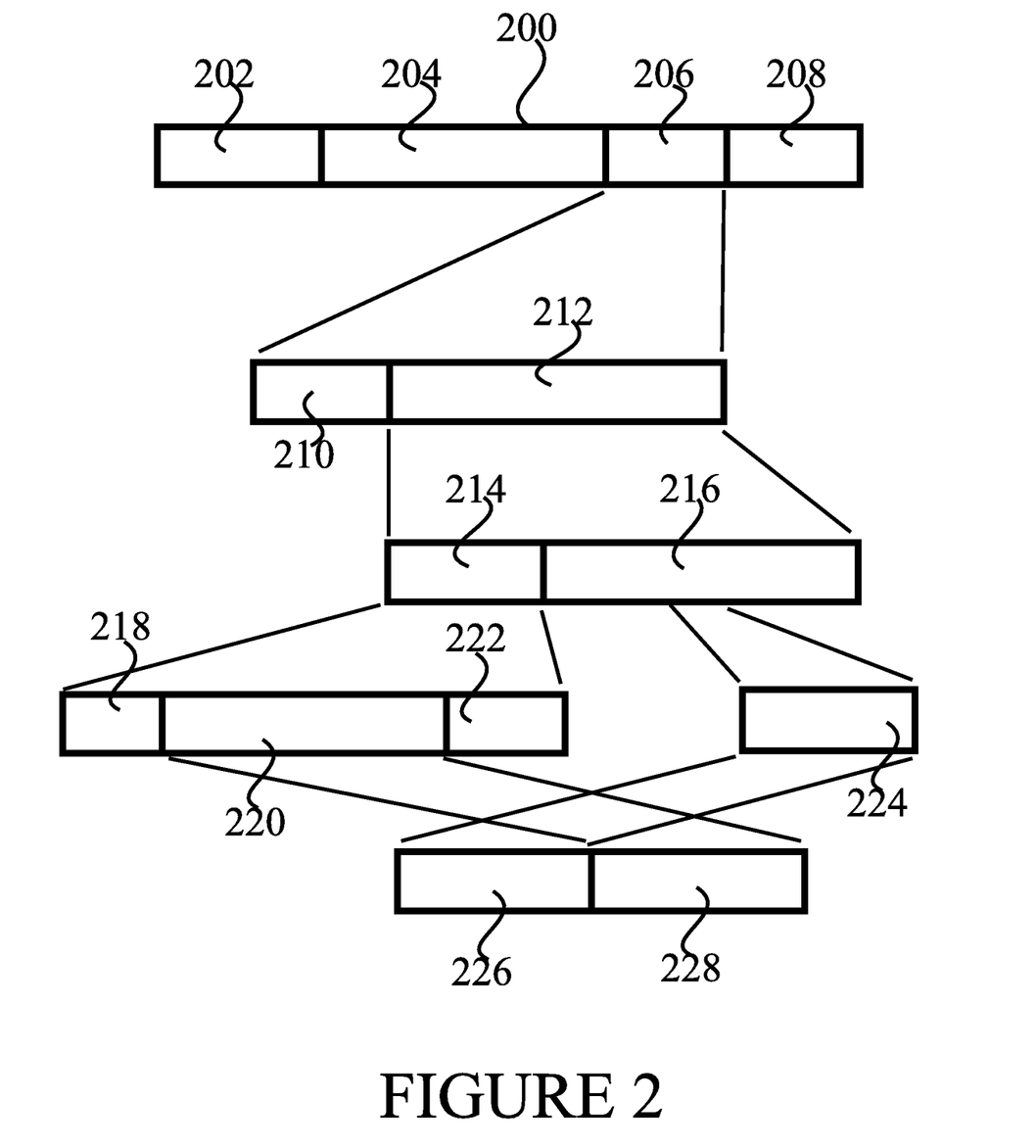
FIG. 2 illustrates a message format in accordance with at least some embodiments of the present invention.

FIG. 2 illustrates a message format in accordance with at least some embodiments of the present invention. The format is that of a Bluetooth advertisement packet 200. The advertisement packet 200 is subdivided into a preamble 202, a sync word 204, a protocol data unit, PDU, 206 and a cyclic redundancy check, CRC, 208. The preamble may be of length 8 bits, the sync word 32 bits and the CRC 24 bits, for example.

The PDU 206 may be subdivided into a header 210 of 16 bits and a payload field 212, for example. Header 210 may comprise a Bluetooth advertisement packet header type, such as ADV_NONCONN_IND, for example. Payload field 212 may be, in turn, subdivided into an AdvA field corresponding to a Bluetooth address of an advertising device of 48 bits, 214, and an advertising data structure 216 of variable length. Bluetooth address 214 may comprise a hash field 218, for example of 24 bits, a random prand field 220, for example of 22 bits, and a field "10" 222 of those two bits, for example. Comprised in data structure 216 may be field 224, storing the second part of the protection bit sequence. The first part of the protection bit sequence may be stored at least in part in prand field 220, for example, and an encrypted version of the first part in hash field 218, for example.

The separate checksum field 208 may be omitted when a hash value is included in the message, since a hash check may be employed to reveal bit errors that occur during transmission, in other words, the hash may effectively act as a checksum. In some embodiments, checksum field 208 is retained in the message but another checksum is omitted, relying instead at least partly on the hash value. For example, checksum field 208 may be needed to comply with a communication standard. A hash value may be calculated based on the secret key of the device and the message contents, including the device address. This means that the entire protection bit sequence, both least significant part and most significant part, may be included in the hash calculation. The hash value, or truncated hash value, may be included in the message in a suitable location, which need not be a field explicitly defined in a specification as a hash value field. Rather, the hash value or truncated hash value may be in a payload field, for example, along with other information.

Instead of using a counter, a timestamp may be used as the protection bit sequence. The timestamp may comprise 4 bytes, being 32 bits, for example. The timestamp may be expressed as UNIX time, seconds since January 1970, for example. In this case, the 22 most significant bits of the timestamp may be stored in the device address, and 10 bits are stored in the message payload. Using this scheme, the device address changes once every 17 minutes in case a message is sent each second. In this scheme, two consecutive messages may get the same timestamp, so the receiver must accept also messages that have the same timestamp as the highest received timestamp from the same sender, at least until the difference to wall clock time grows too large.

For an example where the protection bit sequence is a counter, let's assume the sender's current counter value is 12345. In binary, that is 11000000111001. Let us assume that we assign 10 bits to the least significant part of the counter. The 10 least significant bits of the counter value, in binary, is 0000111001. The most significant part, which is used as the random part in the device address, is 1100, so the 22 bits of the random part in the device address are 0000000000000000001100. The sender includes to the message payload the least significant part of the counter, the second part of the protection bit sequence, 0000111001, and a hash value calculated from at least the device address, the message contents including the least significant part of the counter and the secret key of the device. If there were, say, 10 bytes, being 80 bits, overall available in the message, we used 10 bits for the counter, which means 70 bits can be used for the hash value, which may be truncated. This would be already be 6 bits more than the minimum of 8 bytes, being 64 bits, which brings a significant decrease in collision likelihood.

The recipient of the message may then check if the device address is among the known addresses. If it is, the receiver looks up the associated secret key as described above. If it is not, the receiver tries every secret key it knows to encrypt the random part of the device address, and checks if the result matches the hash part of the device address. If it does, then the sender is the sender that is associated with that secret key. The recipient then reconstructs the counter by concatenating the most significant part, which is the random part of the device address, 0000000000000000001100, with the least significant part, which is the counter in the message body, 0000111001, obtaining 00000000000000000011000000111001, which is 12345 in decimal.

The recipient may then calculate the hash value the same way as the sender, using at least the device address, the message contents including the least significant part of the counter, and the stored shared secret for that sender, and compare the result to the hash value in the message. Since all the values used for calculating the hash are the same, the result matches, and the message is authenticated.

The recipient may also check that the entire counter, that is, the concatenation of most significant part in the device address and least significant part in the payload is strictly greater than the last saved counter value received from the same sender, possibly allowing for rollover as previously described. If it is not, the message is a replay or a duplicate, and is rejected. If it is, the message is accepted and the counter value in the message is saved as the new counter value for that sender.

Figure 3:
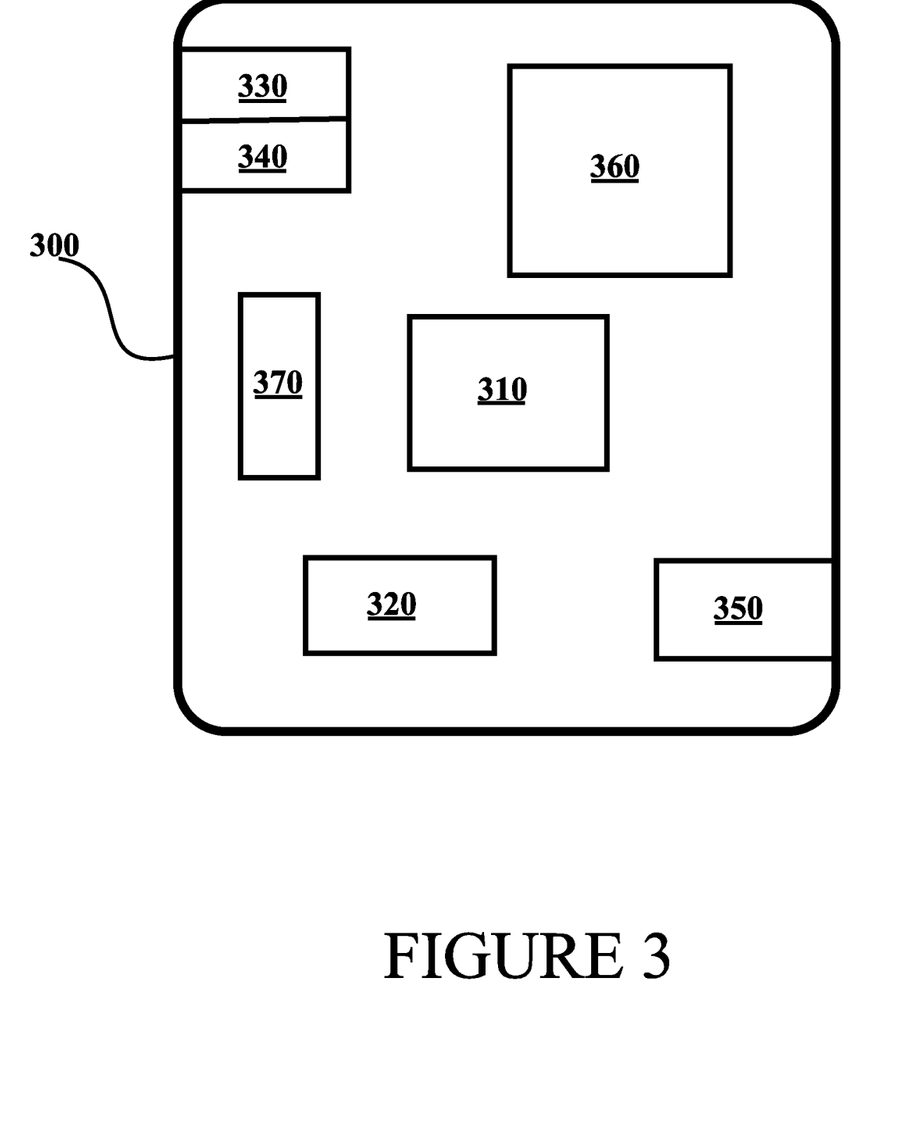
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 or a recipient of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to open doors, accept incoming telephone calls, to originate telephone calls or video calls, to browse the Internet, to manage digital files stored in memory 320 or on a cloud accessible via transmitter 330 and receiver 340, or via NFC transceiver 350, and/or to play games, for example.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
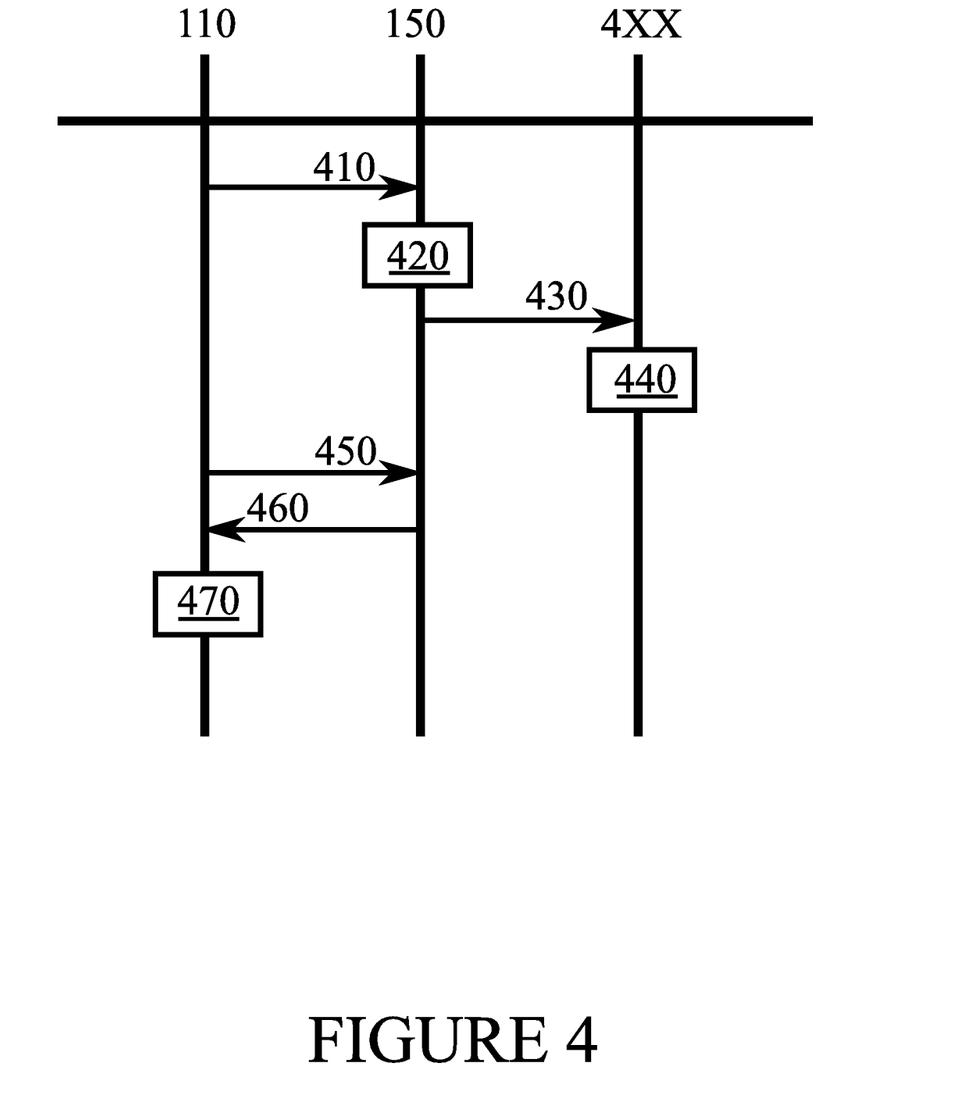
FIG. 4 illustrates signalling in accordance with at least some embodiments of the present invention.

FIG. 4 illustrates signalling in accordance with at least some embodiments of the present invention. On the vertical axes are disposed device 110, recipient 150 and apparatus 4XX. Device 110 and recipient 150 may correspond to like structure as in the system of FIG. 1. Apparatus 4XX may be an apparatus controlled, at least in part, by recipient 150. For example, apparatus 4XX may comprise an electronically locked door or industrial process control device that is arranged to function based, at least in part, on directions received from recipient 150.

Phase 410 comprises transmitting, from device 110, a message to recipient 150. The message may be conveyed via a suitable wired or wireless medium, such as, for example, a universal serial port, USB, cable or a Bluetooth connection. The message may comprise a truncated timestamp and/or a truncated hash value, as laid out above.

In phase 420, recipient 150 verifies the message received in phase 410. Verification in phase 420 may comprise determining an identity of device 110 having sent the message, as described above, and checking the protection bit sequence is consistent with a protection bit sequence of an immediately preceding, that is, the previous, message from device 110 in a sequence of messages from device 110. In case the protection bit sequence is less than or equal to the immediately preceding protection bit sequence, recipient 150 may reject the message. The verification may further comprise re-deriving a hash value from the contents of the message and a secret shared with device 110. It may then be checked, whether the re-derived hash value is consistent with the hash value or truncated hash value comprised in the received message. In case the hash is successfully verified, recipient 150 may have good confidence that the message is authentically from device 110 and not replayed.

Responsive to a successful verification, recipient 150 may, in phase 430, instruct apparatus 4XX to perform an action, which may be an action that device 110 requested in the message of phase 410. Responsively, in phase 440, apparatus 4XX performs the action.

In phase 450, device 110 transmits a second message to recipient 150. The message may have similar content fields as the message transmitted in phase 410. At the time the message of phase 450 is transmitted, the clock of device 110 has drifted with respect to the clock in recipient 150, with the consequence that when the message is verified in recipient 150, the reconstructed protection bit sequence, being in this example a timestamp, may fail in comparison to a time from a clock that is available to recipient 150.

Responsive to the failure in verification in recipient 150, a message may be dispatched back to device 110, in phase 460, this message comprising an indication of a current time according to the clock of recipient 150. The time of recipient 150 is set as the current time of device 110 in phase 470, thereby aligning the clock of device 110 with that of recipient 150.

Figure 5:
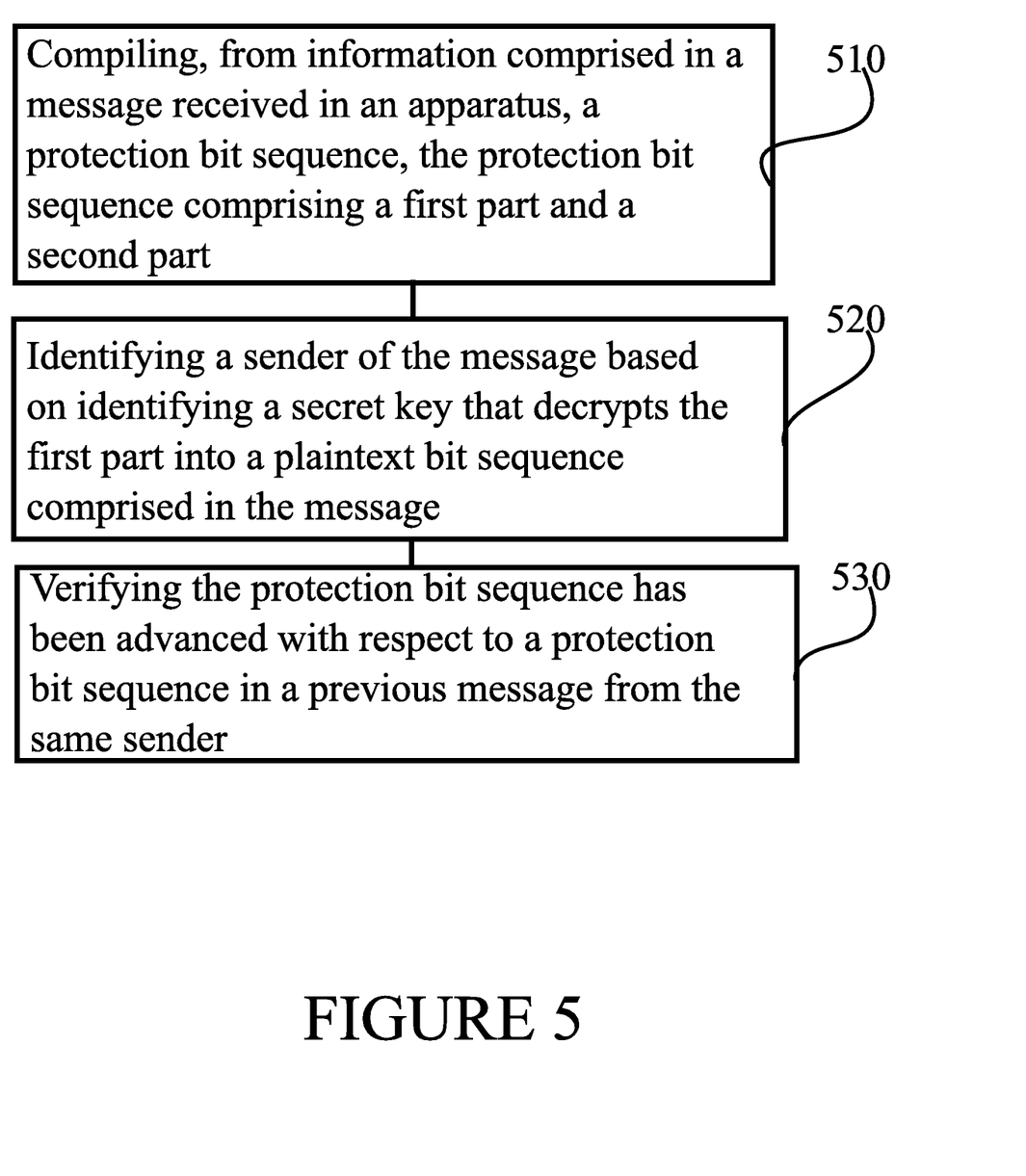
FIG. 5 is a first flow graph illustrating a first method in accordance with at least some embodiments of the present invention.

FIG. 5 is a first flow graph illustrating a first method in accordance with at least some embodiments of the present invention. The phases of the illustrated method may be performed in a recipient device, for example, or in a control device configured to control the functioning of a recipient device, when implanted therein.

Phase 510 comprises compiling, from information comprised in a message received in an apparatus, a protection bit sequence, the protection bit sequence comprising a first part and a second part. Phase 520 comprises identifying a sender of the message based on identifying a secret key that decrypts the first part into a plaintext bit sequence comprised in the message. The first part may be present in the message, in encrypted form, in a different data field than the plaintext bit sequence corresponding to the decrypted first part. Phase 530 comprises verifying the protection bit sequence has been advanced with respect to a protection bit sequence in a previous message from the same sender.

Figure 6:
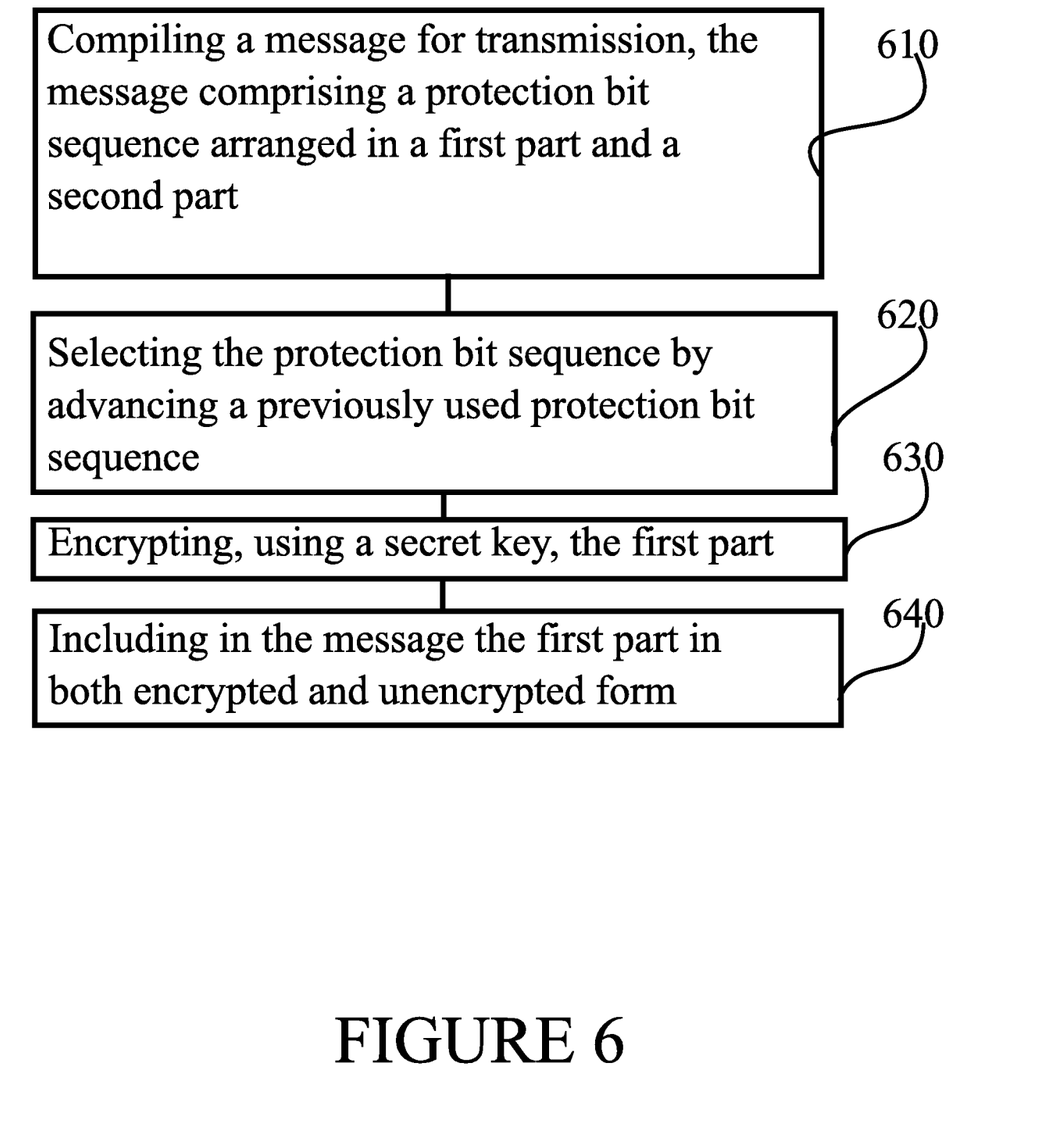
FIG. 6 is a second flow graph illustrating a second method in accordance with at least some embodiments of the present invention.

FIG. 6 is a second flow graph illustrating a second method in accordance with at least some embodiments of the present invention. The phases of the illustrated method may be performed in a sender device, for example, or in a control device configured to control the functioning of a recipient device, when implanted therein.

Certain advantages may be provided by various embodiments of the present invention. For example, the amount of space needed in the message for replay protection may be reduced, while at the same time enabling anonymization of message sender information. The anonymization enables compliance with stricter privacy protection requirements. The space saved may be used in positioning messages to increase the strength of an integrity protection hash, and/or to store sensor data in positioning messages, which reduces the number of messages that need to be sent and thus reduces energy consumption and increases battery life where devices are battery powered. The saved space may be used to increase the length of the positioning data in the message, which may increase positioning performance. Using some embodiments of the invention may enable us to make a good tradeoff between message integrity protection and authentication robustness, battery life and positioning performance.

Another advantage of certain embodiments of the invention is that the anonymized device addresses may be made compliant with the Bluetooth specification, so they can be handled by standards-compliant Bluetooth devices. This can be useful because it allows third party systems to recognize the sender identity if they are provisioned with the secret keys and identities of the devices.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in message authentication.

Acronyms List

AAA Definition
BTLE Bluetooth-low energy
IS-95 interim standard 95
LTE long term evolution
PDU protocol data unit
SHA-1 secure hash algorithm 1
USB universal serial port
WiMAX worldwide interoperability for microwave access
WLAN wireless local area network
WCDMA wideband code division multiple access

| REFERENCE SIGNS LIST | |
| --- | --- |
| 110 | Device |
| 120 | Base station |
| 130 | Recipient |
| 140 | Access point |
| 150 | Recipient |
| 112 and 114 | air interfaces |
| 123 and 145 | connections |
| 200 | Bluetooth low energy advertisement packet (FIG. 2) |
| 202-228 | Fields comprised in Bluetooth low energy advertisement packet 200 |
| 300-370 | Structure illustrated in FIG. 3 |
| 410-470 | Phases of the signalling process illustrated in FIG. 4 |
| 510-540 | Phases of the method illustrated in FIG. 5 |
| 610-640 | Phases of the method illustrated in FIG. 6 |

The invention claimed is:

1. An apparatus comprising at least one processing core, at least one memory including computer program code, the at least one memory and the computer program code being configured to, with the at least one processing core, cause the apparatus at least to:
compile, from information comprised in a message received in the apparatus, a protection bit sequence, the protection bit sequence comprising a first part and a second part, the first part comprising a segment of most significant bits of the protection bit sequence and the second part comprising a segment of least significant bits of the protection bit sequence;
identify a sender of the message based on identifying a secret key that decrypts the first part into a plaintext bit sequence comprised in the message;
verify that a number represented by both parts together of the protection bit sequence has been incremented or decremented with respect to a protection bit sequence in a previous message from the same sender, and
determine a subsequent first part that will be associated with a set of future messages from the sender, when advancing the protection bit sequence will cause the first part to change.

2. The apparatus according to claim 1, wherein the plaintext bit sequence is distinct from the first part and the second part.

3. The apparatus according to claim 1, wherein the protection bit sequence comprises a counter or a timestamp.

4. The apparatus according to claim 1, wherein the first part is comprised in an address field of the message.

5. The apparatus according to claim 4, wherein the address field is a sender address field.

6. The apparatus according to claim 1, wherein the at least one memory and the computer program code are configured to, with the at least one processing core, cause the apparatus to determine the subsequent first part responsive to a determination that the apparatus has spare computation capacity.

7. The apparatus according to claim 1, wherein the at least one memory and the computer program code are configured to, with the at least one processing core, cause the apparatus to determine a set of subsequent first parts, each subsequent first part in the set corresponding to a distinct sender, responsive to the determination that the apparatus has spare computation capacity.

8. A computer implemented method using at least one or more hardware processors, the method comprising:

compiling, from information comprised in a message received via a computer network in an apparatus, a protection bit sequence, the protection bit sequence comprising a first part and a second part, the first part comprising a segment of most significant bits of the protection bit sequence and the second part comprising a segment of least significant bits of the protection bit sequence;

identifying, using the at least one or more hardware processors, a sender of the message based on identifying a secret key that decrypts the first part into a plaintext bit sequence comprised in the message;

verifying, using the at least one or more hardware processors, that a number represented by both parts together of the protection bit sequence has been incremented or decremented with respect to a protection bit sequence in a previous message from the same sender, and determining a subsequent first part that will be associated with a set of future messages from the sender, when advancing the protection bit sequence will cause the first part to change.

9. The method according to claim 8, wherein the plaintext bit sequence is distinct from the first part and the second part.

10. The method according to claim 8, wherein the protection bit sequence comprises a counter or a timestamp.

11. The method according to claim 8, wherein the first part is comprised in an address field of the message.

12. A non-transitory computer readable medium having stored thereon a set of computer readable instructions that, when executed by at least one processor, cause an apparatus to at least:

compile, from information comprised in a message received in the apparatus, a protection bit sequence, the protection bit sequence comprising a first part and a second part, the first part comprising a segment of most significant bits of the protection bit sequence and the second part comprising a segment of least significant bits of the protection bit sequence;

identify a sender of the message based on identifying a secret key that decrypts the first part into a plaintext bit sequence comprised in the message;

verify that a number represented by both parts together of the protection bit sequence has been incremented or decremented with respect to a protection bit sequence in a previous message from the same sender, and determine a subsequent first part that will be associated with a set of future messages from the sender, when advancing the protection bit sequence will cause the first part to change.

\* \* \* \* \*